(12) United States Patent
Fleming et al.

(10) Patent No.: US 11,405,409 B2
(45) Date of Patent: Aug. 2, 2022

(54) THREAT-AWARE COPY DATA MANAGEMENT

(71) Applicant: HEWLETT PACKARD ENTERPRISE DEVELOPMENT LP, Houston, TX (US)

(72) Inventors: Neil Andrew Fleming, Erskin (GB); Alastair Michael Slater, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 425 days.

(21) Appl. No.: 16/397,967

(22) Filed: Apr. 29, 2019

(65) Prior Publication Data

US 2020/0344247 A1 Oct. 29, 2020

(51) Int. Cl.
  *G06F 11/00* (2006.01)
  *H04L 9/40* (2022.01)
  *H04L 67/1095* (2022.01)
  *G06F 11/14* (2006.01)

(52) U.S. Cl.
  CPC ...... *H04L 63/1416* (2013.01); *G06F 11/1464* (2013.01); *H04L 63/1441* (2013.01); *H04L 67/1095* (2013.01)

(58) Field of Classification Search
  CPC ............. H04L 63/1416; H04L 63/1441; H04L 67/1095; H04L 63/1425; H04L 67/1002; H04L 2029/06054; H04L 29/0854; G06F 11/1464
  USPC ............................................. 726/22–26, 32
  See application file for complete search history.

(56) References Cited

U.S. PATENT DOCUMENTS

| | | | |
|---|---|---|---|
| 7,249,251 B2 | 7/2007 | Todd et al. | |
| 7,594,266 B2 | 9/2009 | Mattsson et al. | |
| 7,840,992 B1* | 11/2010 | Dufrene | G06F 11/1461 726/1 |
| 9,432,335 B1* | 8/2016 | Stevenson | H04L 63/0272 |
| 9,462,010 B1* | 10/2016 | Stevenson | H04L 63/1433 |
| 9,639,693 B2* | 5/2017 | Rivera | G06F 21/566 |
| 9,934,379 B2* | 4/2018 | Monrose | G06F 21/57 |
| 10,609,066 B1* | 3/2020 | Nossik | H04L 63/1408 |
| 10,902,014 B1* | 1/2021 | Adogla | G06F 16/27 |
| 11,113,152 B1* | 9/2021 | Jha | G06F 11/1451 |
| 2007/0136541 A1* | 6/2007 | Herz | G06F 11/1458 714/E11.124 |
| 2007/0186282 A1* | 8/2007 | Jenkins | H04L 63/1416 726/22 |
| 2011/0041004 A1 | 2/2011 | Miwa et al. | |
| 2012/0221697 A1* | 8/2012 | Sainio | H04L 67/26 709/223 |
| 2014/0325616 A1 | 10/2014 | Dolph et al. | |

(Continued)

OTHER PUBLICATIONS

Barracuda Networks, Inc., "Pause Offsite Replication," Sep. 25, 2018, https://campus.barracuda.com/product/backup/doc/78809436/pause-offsite-replication/.

*Primary Examiner* — Thu Ha T Nguyen
(74) *Attorney, Agent, or Firm* — Trop, Pruner & Hu, P.C.

(57) ABSTRACT

Examples include threat-aware copy data management. Responsive to a request to back up data, a threat level may be determined. Where the threat level is determined to be less than a threat level threshold, a data port between a first and second network domain may be opened. Conversely, the request may be denied where the threat level is determined to be at or greater than the threat level threshold.

19 Claims, 6 Drawing Sheets

(56) References Cited

U.S. PATENT DOCUMENTS

| | | | |
|---|---|---|---|
| 2016/0179624 A1* | 6/2016 | Stuntebeck | G06F 16/215 707/653 |
| 2017/0180394 A1* | 6/2017 | Crofton | G06F 21/64 |
| 2017/0223031 A1* | 8/2017 | Gu | G06F 11/1448 |
| 2019/0108340 A1* | 4/2019 | Bedhapudi | G06F 21/554 |
| 2019/0109870 A1* | 4/2019 | Bedhapudi | G06F 21/566 |
| 2019/0121978 A1* | 4/2019 | Kraemer | G06F 21/565 |
| 2019/0132350 A1* | 5/2019 | Smith | G06Q 20/38215 |
| 2020/0007548 A1* | 1/2020 | Sanghavi | H04L 63/0209 |
| 2020/0380130 A1* | 12/2020 | Purushotham | G06F 9/45558 |
| 2020/0401938 A1* | 12/2020 | Etkin | G06V 10/768 |
| 2021/0042199 A1* | 2/2021 | Migga-Vierke | G06F 11/3058 |
| 2021/0144169 A1* | 5/2021 | Lasser | H04L 43/06 |
| 2021/0173930 A1* | 6/2021 | Dahal | H04L 63/145 |
| 2021/0342189 A1* | 11/2021 | Zhang | H04L 63/101 |
| 2021/0344752 A1* | 11/2021 | Chang | G06F 3/067 |

\* cited by examiner

THREAT-AWARE COPY DATA MANAGEMENT

BACKGROUND

Threat-detection systems aim to detect threats, such as malware, within a computing environment by monitoring data within the computing environment. Malicious machine readable instructions may be deployed to devices in communication over a network and may exploit the vulnerabilities of a device, or a network of devices. If left undetected, malicious software may gather, change, or destroy sensitive information, disrupt the general operations of a device, gain access to private computer systems, carry out undesired operations on a device, and/or any other combinations of harmful activity. Threat-detection systems are employed to detect malicious machine readable instructions before the operations of malicious machine readable instructions are executed, or to mitigate damage caused by operations of malicious machine readable instructions already executed.

BRIEF DESCRIPTION OF THE DRAWINGS

The following detailed description references the drawings, wherein.

DETAILED DESCRIPTION

As noted above, data may be harmed or otherwise manipulated due to malicious software such as ransomware, which may be generated by unauthorized users or otherwise bad actors. Computing environments are under increasing threat of intrusion, which continually threatens the integrity of data. Intrusions may enter a system in a number of ways. For example, an intrusion may occur through an external gateway of a data center. As another example, an intrusion may occur internally, such as over the Local Area Network (LAN) of a system, or locally on a device, such as through a physical or virtual port on a computing device.

Threat detection software enables the early detection, prevention, and/or the suppression of malicious intrusions to a computing system. Threat detection software may be software in the form of a threat detection manager, which may, among other functions, monitor an on-premise and/or cloud computing environment for intrusions, analyze these environments for anomalous behavior, and/or take preventative measures to suppress the consequences of or otherwise eliminate such an intrusion. Because of the variety of ways a system may suffer intrusion, a threat detection manager may monitor both external gateways as well as internal traffic.

To prevent data loss, computing environments, such as enterprise data centers, often employ data redundancy schemes. Thus, computing environments may create data backups from which data may be restored responsive to a data loss event. Data backups may be stored local to a computing environment, but, may often be stored at remote locations and/or at a different network domain than that of the original data. This may prevent total loss of data due to a physical disaster, such as a fire or power outage, as well as total loss of data due to a network intrusion at a particular network domain.

Additional redundancy schemes may be employed other than data backups. For example, a first storage system (or computing environment) may replicate data to a second storage system (or computing environment), which may be located at a location remote from the first storage system. The replication may be performed in a synchronous manner (e.g., a request is processed at both the first and second storage systems before being acknowledged to the host or other provider of the request). In other examples, the replication may be performed in an asynchronous manner (e.g., a request is processed at the first storage system and acknowledged before the request is replicated to the second storage system. Replication differs from data backups in that replicas may be updated at a much greater frequency than data backups, for example, and may more quickly lose their historical state than data backup counterparts.

The process of backing up and/or replicating data may be implemented and otherwise governed by a copy data manager. The copy data manager may create data backups, including data snapshots, in accordance with various policies. Similarly, a copy data manager may replicate data according to a policy, such as after a period of time, or any number of other triggered events and/or met conditions. The copy data manger may rely on active links and/or common roots of trust to replicate and backup data at different storage locations.

While a copy data manager is intended to protect the integrity of data, the opposite may occur when a copy data manager is ignorant to network intrusions or other corruptions of data. For example, an intruder may exploit the trust relationships relied on by the copy data manager to cause the copy data manager to replicate or otherwise backup corrupted data, which may consequently spread the corrupted data to different devices, different physical sites, different network domains, etc. The copy data manager may replicate, and/or backup corrupt data objects across network domains, and may overwrite older, uncorrupted copies of data with newer, corrupted copies of data. In some cases, non-corrupted copies of data may be permanently lost. A system may take a reactive approach or remedial measures responsive to detection of an intrusion, such as by quarantining data or otherwise blocking connection ports between devices, sites, etc. However, such a reactive approach may not successfully prevent the spread of corrupted data before unrecoverable consequences transpire.

To address these issues, examples described herein include threat-aware copy data management. For example, a data port of a connection between a first network domain and a second network domain may be closed by default, and may be controlled by a threat detection manager. A copy data manager may transmit a request to enable the backup of data from the first network domain to the second network domain according to a policy. The threat detection manager, responsive to the request, may determine a threat level status of the first network domain.

Where the threat level is determined to be below a threshold, the threat detection manager may open the closed data port between the first network domain and the second network domain to thereby enable the copy data manager to transmit a backup copy of the data to the second network domain. Upon completion of the transmission, the threat detection manager may close the data port to isolate each network domain. For example, the threat detection manager may receive a transmission completion acknowledgement from the Copy Data Manager upon completion of the transmission, and, responsive to the acknowledgement, may close the data port. In some examples, the first and second network domain are not able to communicate when the data port is closed (i.e., are unable to transfer data to one another directly and/or indirectly).

When the threat level is determined to be at or above the threshold, the threat detection manager may refuse to grant the request to enable the copy data manager to back up data. Specifically, the threat detection manager may suspend the backup data request, and otherwise keep the data port closed. For example, the threat detection manager may place the backup request in a request queue, and the request may be satisfied upon a determination that the threat level has dropped below the threshold.

Figure 1:
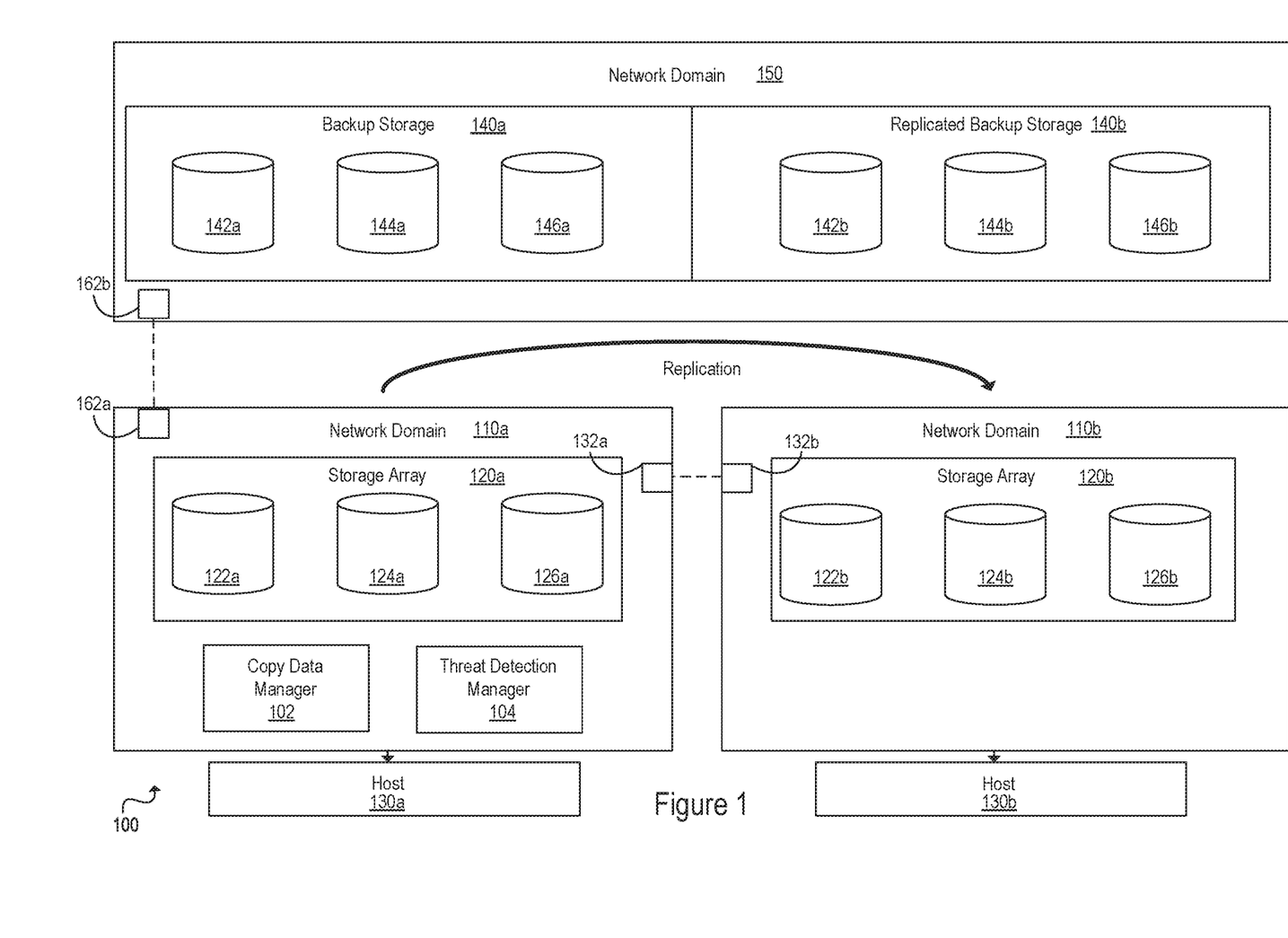
FIG. 1 is a block diagram of an example system including threat-conscious copying of data between different network domains.

Referring now to the drawings, FIG. 1 is a block diagram of an example system 100 including threat-conscious copying of data between different network domains. In an example, a network domain may be an administrative grouping of one or more computing devices. For example, a given host may have access to all computing device(s) of a given network domain, and may gain access to those computing device(s) using one set of access credentials. For instance, a user with permissions to access example network domain 110a may not use these same permissions to access network domain 110b. Resources of a first network domain may be on separate physical devices, virtually partitioned on a same physical device, or any combination thereof.

System 100 may include a primary network domain 110a, including storage array 120a, having storage volumes 122a, 124a, and 126a for storing data, e.g. data objects. Host 130a may communicate with resources in network domain 110a. Network domain 110a may include a copy data manager 102 and a threat detection manager 104, whose functionality is further described herein. Copy data manager 102 and threat detection manager 104 may each be implemented by machine-readable instructions stored on a non-transitory machine-readable storage medium and executable by at least one processing resource to implement the functionalities described herein in relation to copy data manager 102 and threat detection manager 104.

In some examples, copy data manager 102 and threat detection manager 104 may each be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing device may include the at least one machine-readable storage medium storing the instructions and the at least one processing resource to execute the instructions. In other examples, the engine may be implemented by electronic circuitry.

Copy data manager 102 may replicate data of storage array 120a to a different network domain than network domain 110a, e.g. to a storage array 120b on network domain 110b. In some example implementations, devices of network domain 110b, such as storage array 120b, may be physically (e.g., geographically) remote from device(s) of network domain 110a, such as storage array 120a. In this example, host 130b may have access to resources of network domain 110b and host 130a may have access to resources of network domain 110a. In order to replicate storage array 120a on network domain 110b, copy data manager may communicate data from network domain 110a to network domain 110b via data ports 132a and 132b. Data ports 132a and 132 be may be physical ports, such as a physical Ethernet port on a network switch, or virtual ports in an operating system (OS) or hypervisor that act as communication gateways between domains. Data may be transferred from data port 132a to 132b via a trusted connection. When data ports 132a and 132b are open, copy data manager may freely transmit replication data from data port 132a to data port 132b. However, in an example implementation, copy data manager may not transmit replication data from network domain 110a to network domain 110b when either or both of data ports 132a and 132b are closed, or otherwise blocked.

In some examples, copy data manager 102 may also transfer data from network domain 110a to backup storage 140a (e.g., a secondary or backup storage appliance). Backup storage 140a may include volumes 142a, 144a, and 146a, which may be accessed over network domain 150. In order to back up data objects stored on storage array 120a to backup storage 140a, copy data manager may communicate data from network domain 110a to network domain 150 via data ports 162a and 162b. Like data ports 132a and 132b, data may be transferred from data port 162a to 162b via a trusted connection. When data ports 162a and 162b are open, copy data manager may freely transmit data from data port 162a to data port 162b. However, in an example implementation, copy data manager may not transmit replication data from network domain 110a to network domain 150 when either data port 162a or data port 162b are closed, or otherwise blocked.

In some example implementations, backup storage 140a may be replicated. For example, backup storage may be replicated as replicated volumes 142b, 144b, and 146b respectively, on replicated backup storage 140b. In this example implementation, backup storage 140a and replicated backup storage 140b share a network domain 150. However, in other example implementations, backup storage 140a may be replicated onto a different network domain. Furthermore, while a single instance of replication is illustrated here for purposes of conciseness and clarity, any number of replication instances, backup volumes, and backup storage units may be implemented.

Figure 2:
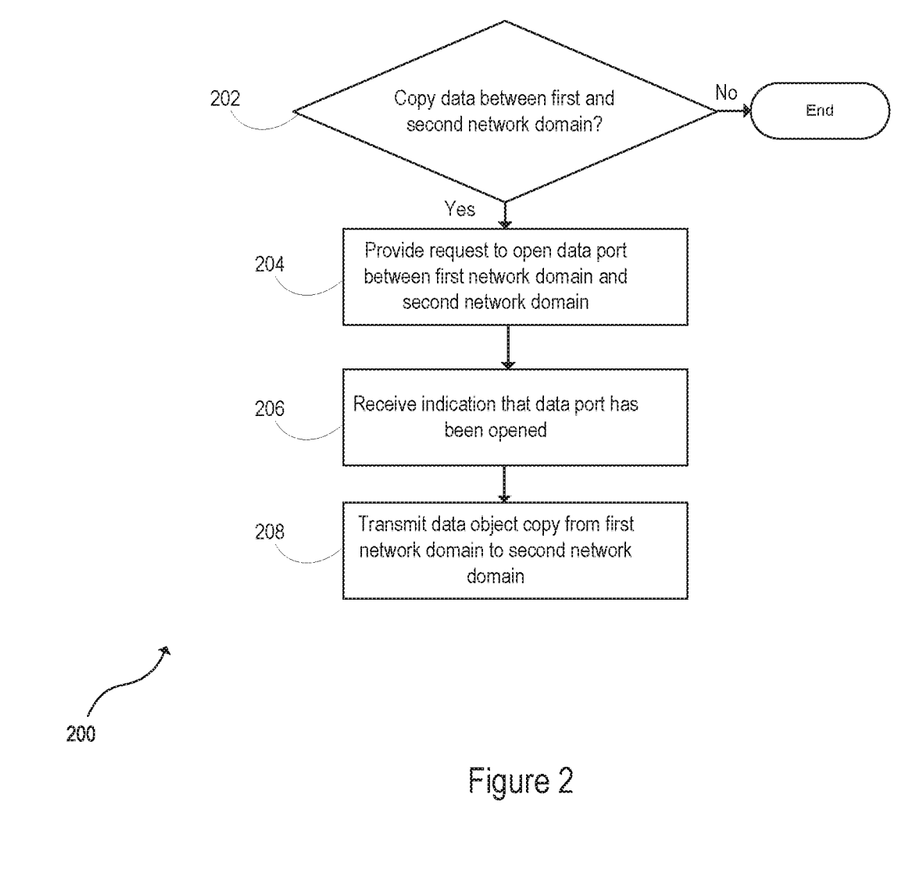
FIG. 2 is a flowchart illustrating an example method for threat conscious transmission of a data object copy from a first network domain to a second network domain.

In an example implementation, copy data manager 102 may not have authority to open example ports 132a and/or 132b, or example ports 162a and/or 162b, and thus may coordinate with threat detection manager 104 to open these respective ports to backup and/or replicate data. In doing so, copy data manager 102 may copy and/or replicate data in a threat conscientious manner. FIG. 2 is a flowchart illustrating an example method for threat conscious transmission, e.g. via the copy data manager, of a data object copy from a first network domain to a second network domain.

Figure 3:
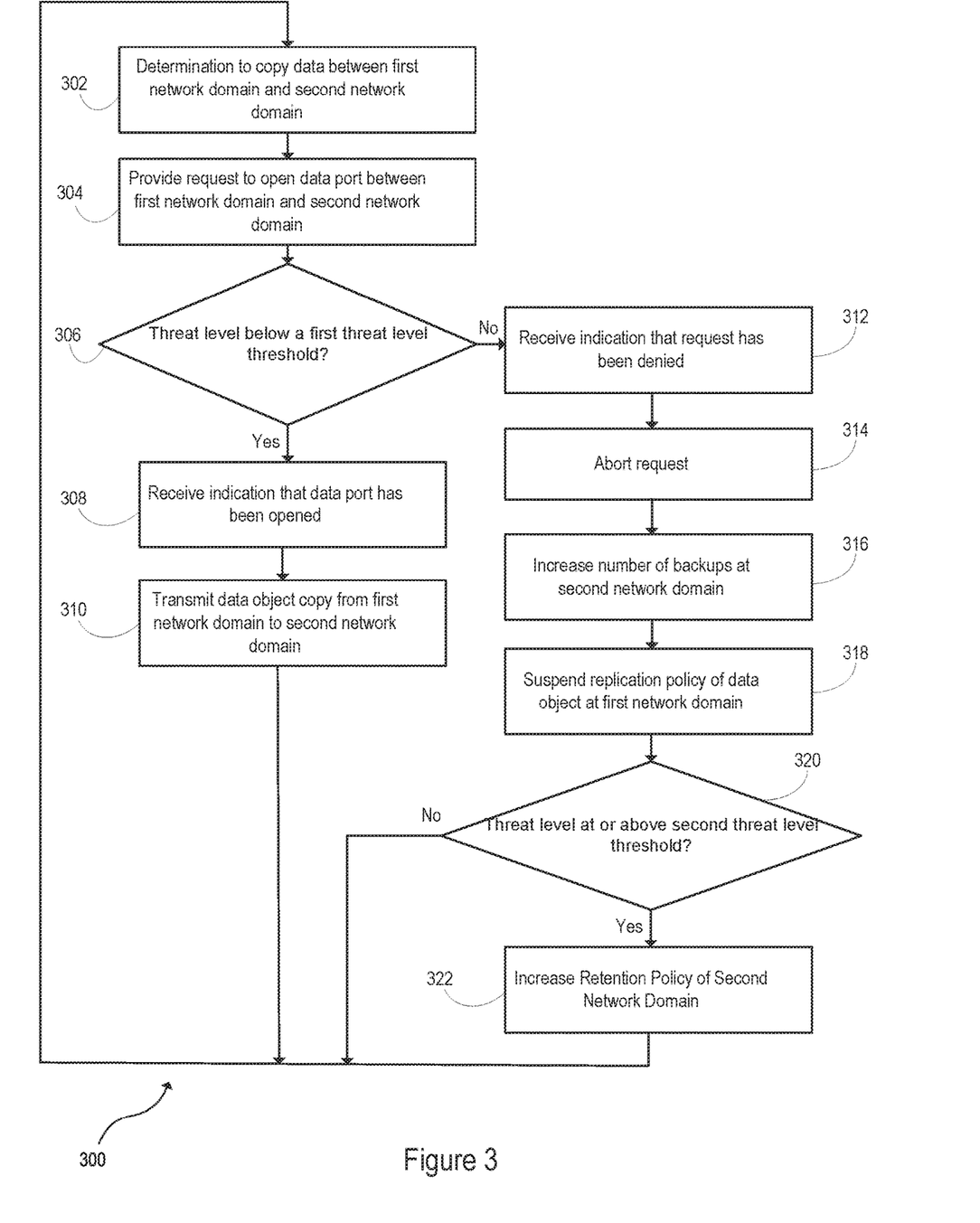
FIG. 3 is a flowchart illustrating another example method for threat conscious transmission of a data object copy from a first network domain to a second network domain.

Execution of method 200 and method 300 is described below with reference to system 100; however, this is for explanatory purposes and other suitable components for execution of method 200 and/or method 300 may be utilized. Additionally, the components for executing method 200 and/or method 300 may spread among multiple devices. Method 200 and/or method 300 may be implemented in the form of executable instructions stored on a non-transitory machine-readable storage medium and/or in the form of electronic circuitry, e.g. hardware. In some examples, steps of method 200 and/or method 300 may be executed substantially concurrently or in a different order than shown in FIG. 2 and FIG. 3 respectively. In some examples, method 200 and/or method 300 may include more or less steps than are shown in FIG. 2 and FIG. 3 respectively. In some examples, some of the steps of method 200 and/or method 300 may, at certain times, be ongoing and/or may repeat.

At block 202, it is determined whether data is to be copied between a first network domain, e.g. network domain 110a of FIG. 1, to a second network domain, e.g. network domain 110b or network domain 150. In an example implementation, the determination may be made by a copy data manager, e.g. copy data manager 102.

In response to a positive determination to block 202, a request is provided at block 204, e.g. via copy data manager 102, to open a data port for connecting a first network domain and a second network domain. For example, copy data manager 102 may request, e.g. from threat detection manager 104, that data port 132a and/or data port 132b be opened, and/or that data port 162a and/or data port 162b be opened, such that copy data manager 102 may transfer data from network domain 110a to either network domain 110b or network domain 150, respectively. Copy data manager 102 may, for example, make this request responsive to the triggering of an event, condition, policy, etc., such as the creation of a data object copy within storage array 120a. The data may be transferred over a physical connection, and/or a wireless connection, such as over a network.

In an example implementation, threat detection manager 104 may open a data port, e.g. any number of data ports 132a and 132b, and 162a and 162b, responsive to the determination that the threat level is below the threat level threshold. At block 206, an indication may be received, e.g. at copy data manager 102, that a data port has been opened. Responsive to receiving an indication that the data port has been open, a data object copy, may be transmitted at block 208, e.g. by copy data manager 102, from a first network domain to a second network domain, e.g. from network domain 110a to network domain 110b and/or network domain 150 respectively. Accordingly, data objects may be transmitted from one network domain to another where a threat level is determined to be below a threat level threshold.

As mentioned above, any number of responsive and/or remedial actions may be taken responsive to a determination that a given threat level is at or above a threat level threshold. FIG. 3 is a flowchart illustrating another example method for threat conscious transmission, e.g. via the copy data manager, describing example responsive and remedial actions for a determination that a threat level is at or above a threat level threshold, as well as example responsive actions for a determination that a threat level is below a threat level threshold.

At block 302, a determination is made to copy data between a first network domain and a second network domain. The determination may be made according to a satisfied condition, rule, network domain policy, etc., which may trigger a COPY ACTION from copy data manager 102. The policy may include a passage of a predetermined amount of time, a data write, a request from a host for copy creation, or any other policy that may trigger the performance of a COPY ACTION. At block 304, in accordance with the COPY ACTION, i.e., an action to transfer a data copy from a first network domain to a second network domain, a request may be provided to open a data port between the first network domain, e.g. network domain 110a, and the second network domain, e.g. network domain 110b or 150. For example, copy data manager 102 may request, e.g. from threat detection manager 104, that data port 132a and/or data port 132b be opened, and/or that data port 162a and/or data port 162b be opened, such that copy data manager 102 may transfer data from network domain 110a to either network domain 110b or network domain 150, respectively.

At block 306, it may be determined whether a threat level is below a threat level threshold. In an example, the threat level may be determined by threat detection manager 104, and threat detection manager 104 may compare the threat level to a predetermined threat level threshold. The threat level may be determined in any number of ways and may be governed by various threat detection and analysis behaviors. The threat level may be indicated by a respective value representing a respective threat level magnitude, a threat level color indicator representing a network domain's respective threat level at a given time, and/or any other number of means implemented by a threat level detection manager to assess and quantify a threat to a system or network domain. Furthermore, the threat level threshold may be determined by any number of means and in some examples, may be predetermined by a network or system administrator.

Responsive to a determination that the threat level is below the threat level threshold, an indication that a data port has been opened may be received at block 308. For example, threat detection manager 104 may open a data port, e.g. any number of data ports 132a and 132b, and 162a and 162b, responsive to the determination that the threat level is below the threat level threshold, and may transmit a confirmation of the data port opening to example copy data manager 102.

Responsive to receiving an indication that the data port has been opened, a data object copy may be transmitted at block 310, e.g. by copy data manager 102, from a first network domain to a second network domain, e.g. from network domain 110a to network domain 110b and/or network domain 150 respectively. The transmission at block 310 may be followed by a return to block 302. Accordingly, data objects may be transmitted from one network domain to another where a threat level is determined to be below a threat level threshold.

It may be determined that the threat level is not below the threat level threshold. Responsive to such a determination, an indication, e.g. from threat detection manager 104, that the request has been denied may be received at block 312, e.g. by copy data manager 102. In some example implementations, the request may be aborted at block 314, e.g. by copy data manager 102.

At block 316, a number of data objects may be increased responsive to receipt of the denial request. For example, a data object may be copied at a predetermined rate according to a policy, and the data object copies may be stored in network domain 150. Specifically, copy data manager 102 may include a policy to create data object copies responsive to the passing of a time, and/or any number of other triggered events or conditions. Responsive to receiving the request denial, copy data manager 102 may change this policy, such that data object copies at network domain 150 are created and otherwise proliferated at a greater rate. In an example implementation, the increased rate at which data objects are copied may gradually decrease as a function of time from when the threat level indication was received. For example, the increased rate may gradually decrease over time at an exponential rate, linear rate, etc.

At block 318, a replication policy of data objects at a first network domain, i.e. the network domain having the threat level above the threat level threshold, may be suspended. For example, a data object may be copied at a predetermined rate according to a policy, and the data object copies may be stored in network domain 110a. Specifically, copy data manager 102 may include a policy to create data object copies responsive to the passing of a time, and/or any number of other triggered events or conditions. Responsive to receiving the request denial, copy data manager 102 may suspend this policy. In an example implementation, the policy suspension may be lifted after a predetermined amount of time, and/or until a threat level indication below a threshold is received.

An indication that the threat level is at or above a second threshold may be received. Specifically, it may be determined at block 320 whether the threat level is at or above a second threat level threshold. Responsive to a positive determination at block 320, a retention policy of a second network domain, e.g. network domain 150 and/or network domain 110b, may be increased at block 322, followed by a return to block 302. For example, an older data object copy may be stored in network domain 150. Backup storage 140a, for example, may include a policy to delete older data object copies responsive to the creation of new data object copies, responsive to the passing of a time, and/or any number of other triggered events or conditions. Responsive to receiving the request denial, copy data manager 102 may suspend this policy, such that an older data object copy that otherwise would be deleted, is retained, e.g. a data object copy stored at backup storage 140a. As another example, older data object copies may have their default expiration times lengthened responsive to receiving the request denial, such that the older data copies are retained for a longer period of time immediately following a received request denial. A negative determination at block 320 may be followed by a return to block 302.

Figure 4:
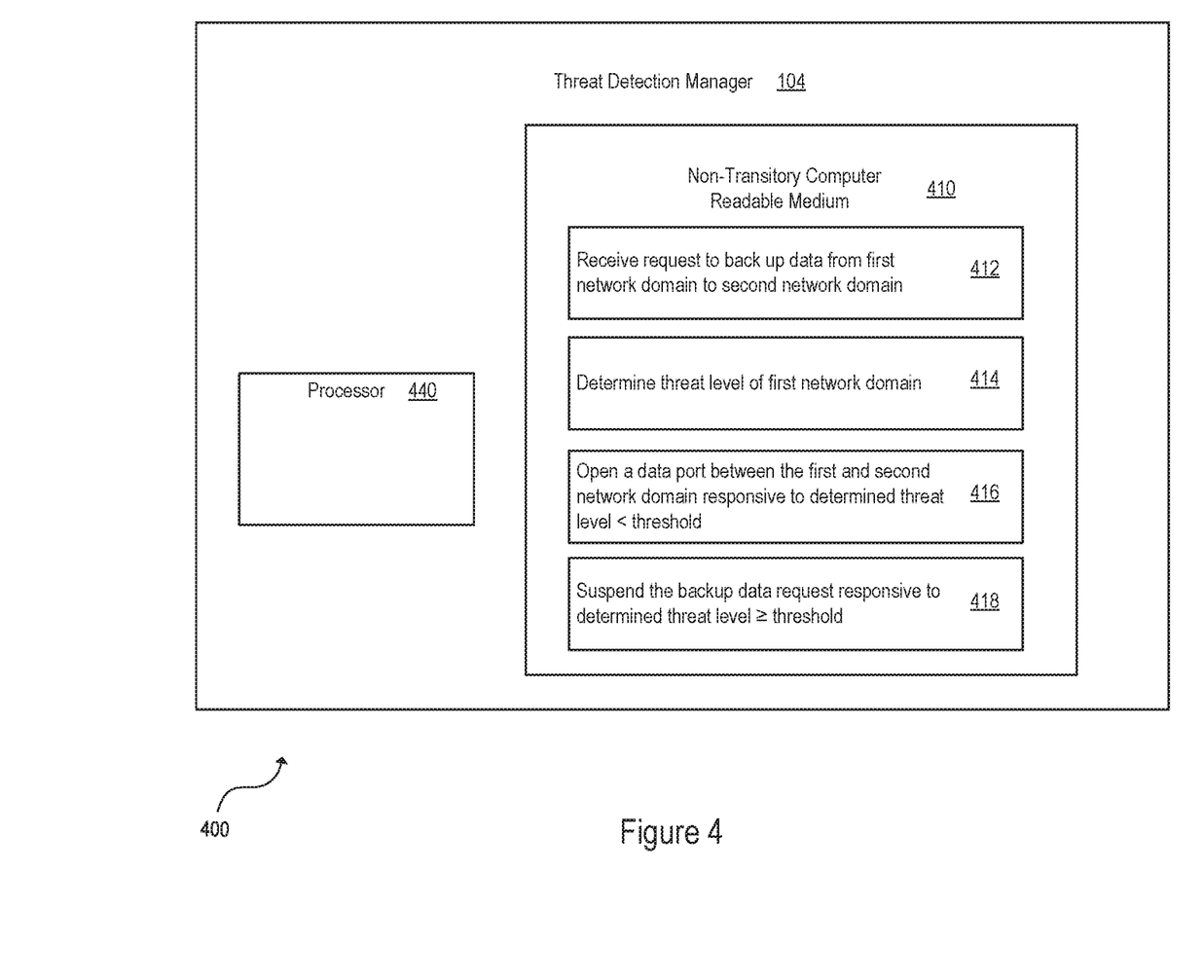
FIG. 4 is a block diagram of an example threat detection manager having non-transitory machine-readable mediums storing instructions for threat conscious copy data management.
Figure 5:
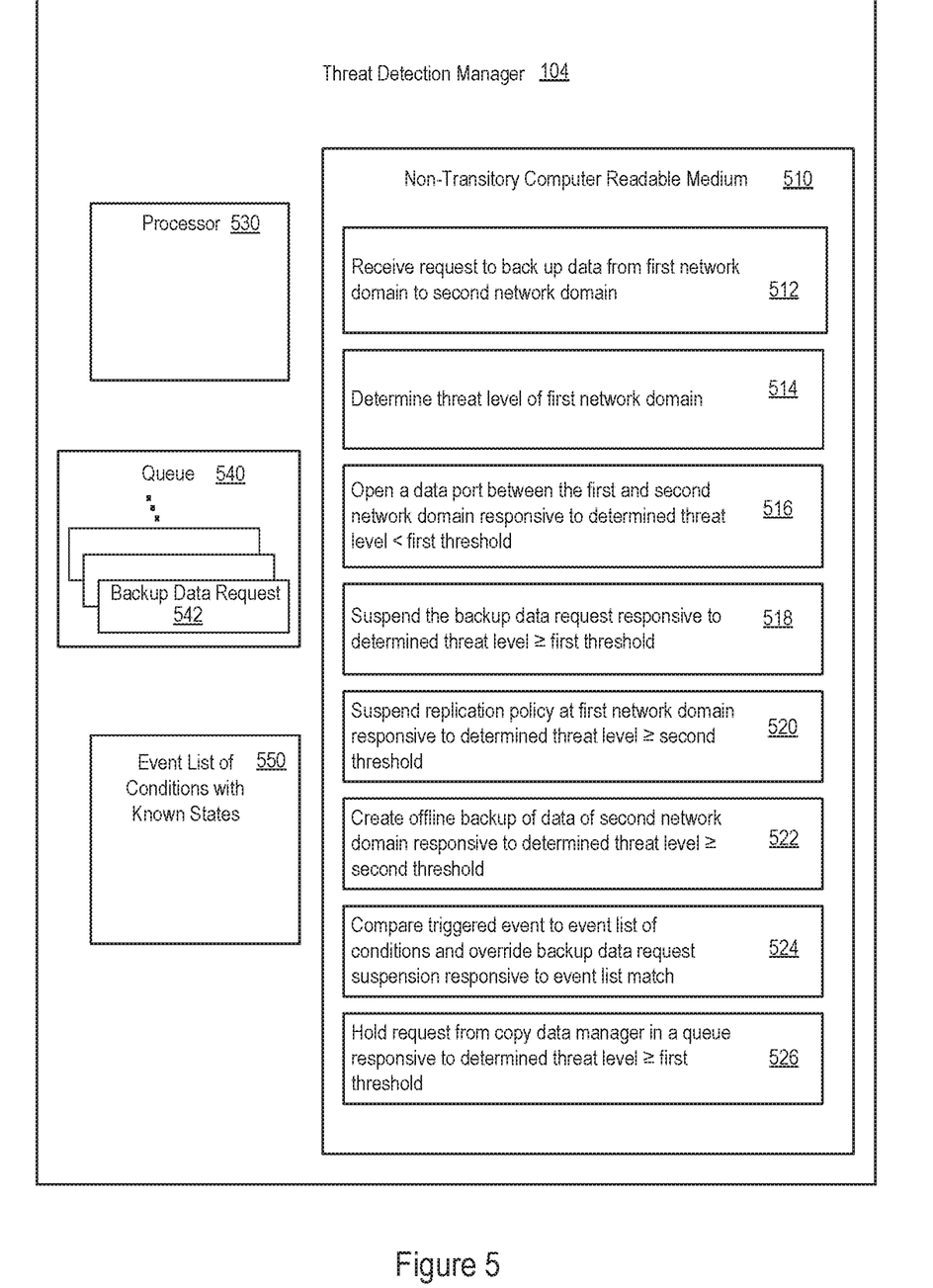
FIG. 5 is a block diagram of another example threat detection manager having non-transitory machine-readable mediums storing instructions for threat conscious copy data management.

FIG. 4 and FIG. 5 are block diagrams, 400 and 500 respectively, of example threat detection manager 104 having non-transitory machine-readable mediums storing instructions for threat conscious copy data management. Non-transitory machine-readable storage medium 410 of FIG. 4 may be coupled to a processor, e.g. processor 430, and non-transitory machine-readable storage medium 510 of FIG. 5 may be coupled to a processor, e.g. processor 530. Non-transitory machine-readable storage medium 410 and non-transitory machine-readable storage medium 510 may include executable instructions thereon.

Non-transitory machine-readable storage medium 410 (or non-transitory machine-readable storage medium 510) may be implemented in a single device or distributed across devices. Likewise, processor 430 (or processor 530) may represent any number of physical processors capable of executing instructions stored by non-transitory machine-readable storage medium 410 (or non-transitory machine-readable storage medium 510). Further, non-transitory machine-readable storage medium 410 (or non-transitory machine-readable storage medium 510) may be fully or partially integrated in the same device as processor 430 (or processor 530), or it may be separate but accessible to that device.

In one example, the instructions may be part of an installation package that when installed can be executed by processor 410 (or processor 510) to execute threat-aware copy data management. In this case, non-transitory machine-readable storage medium 410 (or non-transitory machine-readable storage medium 510) may be a portable medium such as a floppy disk, CD, DVD, or flash drive or a memory maintained by a server from which the installation package can be downloaded and installed. In another example, the program instructions may be part of an application or applications already installed. Here, non-transitory machine-readable storage medium 410 (or non-transitory machine-readable storage medium 510) may include a hard disk, optical disk, tapes, solid state drives, RAM, ROM, EEPROM, or the like.

Processor 430 or 530 may be a central processing unit (CPU), graphics processing unit (GPU), microprocessor, and/or other hardware device suitable for retrieval and execution of instructions stored in non-transitory machine-readable storage medium 410 (or non-transitory computer readable storage medium 510). Processor 430 may fetch, decode, and execute program instructions 412-418, and/or other instructions. Similarly, processor 530 may fetch, decode, and execute program instructions 512-524. As an alternative or in addition to retrieving and executing instructions, processor 430 may include at least one electronic circuit comprising a number of electronic components for performing the functionality of instructions 412-418, and/or other instructions. Similarly, processor 530 may include at least one electronic circuit comprising a number of electronic components for performing the functionality of instructions 512-524, and/or other instructions.

Turning to FIG. 4, non-transitory computer readable medium 410 may include instructions 412 for receiving a request to enable the backup of data from a first network domain, e.g. from copy data manager 102 of network domain 110a. Instructions 414 may further be provided for determining a threat level of the first network domain. Instructions 416 may be provided for opening a data port between a first and second network domain responsive to the determined threat level being below a first threshold. For example, threat detection manager 104 may determine a threat level of network domain 110a to be below a predetermined threshold value, and, responsive to that determination, may open ports 132a and/or 132, and/or ports 162a and/or 162b.

Instructions 418 may be provided for suspending the backup data request responsive to the determined threat level being at or above the threat level threshold. For example, threat detection manager 104 may determine that the threat level at network domain 110a is at or greater than a predetermined threshold, and, responsive to that determination, may refuse the request to enable the backup of data from the first network domain. The respective ports for transmitting the data object off of network domain 110a is thus refused, and in this way network domain 110a remains temporarily quarantined.

Turning to FIG. 5, non-transitory computer readable medium 510 may include instructions 512 for receiving a request to enable the backup of data from a first network domain, e.g. from copy data manager 102 of network domain 110*a*. Instructions 514 may further be provided for determining a threat level of the first network domain. Instructions 516 may be provided for opening a data port between a first and second network domain responsive to the determined threat level being below a first threshold. For example, threat detection manager 104 may determine a threat level of network domain 110*a* to be below a predetermined threshold value, and, responsive to that determination, may open ports 132*a* and/or 132, and/or ports 162*a* and/or 162*b*.

Instructions 518 may be provided for suspending the backup data request responsive to the determined threat level being at or above the threat level threshold. For example, threat detection manager 104 may determine that the threat level at network domain 110*a* is at or greater than a predetermined threshold, and, responsive to that determination, may refuse the request to enable the backup of data from the first network domain. The respective ports for transmitting the data object off of network domain 110*a* is thus refused, and in this way network domain 110*a* remains temporarily quarantined.

Instructions 520 may be provided for suspending a replication policy at a network domain, e.g. at network domain 110*a*, responsive to the determined threat level being above a second threat level threshold. The second threat level threshold may be of a threat level greater than that of the first threat level threshold. In other example implementations, the second threat level threshold may be of a threat level equal to that of the first threat level threshold.

As an example implementation, copy data manager 102 may include a policy to create data object copies responsive to the passing of a time, and/or any number of other triggered events or conditions. Instructions 520 may suspend this policy responsive to the determined threat level being above the second threat level threshold. In an example implementation, the policy suspension may be lifted after a predetermined amount of time, and/or until a threat level indication below a threshold is received.

Instructions 522 may be provided for creating an offline backup of data of a network domain responsive to the determined threat level being above the second threat level threshold. As an illustrative example, any of storage volumes 142*b*, 144*b*, and/or 146*b* of replicated backup storage 140*b* may be taken offline, and thus off of network domain 150, responsive to a determined threat level of network domain 110*a* being above the second threat level threshold. Thus, data of replicated backup storage 140*b* may be insulated from any malware, intrusion, or other threat faced by network domain 110*a*. In an example implementation, replicated backup storage 140*b* may be taken offline and may not be brought back online remotely. In this example, an administer might traverse a physical barrier of a data center with proper physical access credentials in order to bring the replicated backup storage 140*b* back online.

Instructions 524 may be provided for comparing a triggered event at a network domain to an event list of conditions with known states 550. Instructions 524 may determine that the triggered event matches a condition on event list of conditions 550, and, responsive to that determination, may override instructions 518, i.e. suspend the backup data request. In another example implementation, any of instructions 518-522 may be suspended responsive to a determination that the triggered event matches the condition on event list of conditions 550.

For example, responsive to a determination that the threat level is greater than the first and/or second threshold, instructions 524 may cause a processor to compare any recently triggered events at network domain 110*a* with those of event list 550. Triggered events may include, for example, a list of predetermined innocuous events that would otherwise trigger a false positive from a threat detection manager. Example events may include, but are not limited to, the deployment of new hardware at network domain 110*a*, an authorized reconfiguration of network domain 110*a*, etc. Thus, events stored within event list 550 will not unintentionally raise a threat level of a network domain and cause undesired threat prevention and remediation measures.

Instructions 526 may, responsive to the determined threat level being greater than the first threshold, hold a request 542 from a copy data manager in a queue 540 responsive to a determined threat level being greater than or equal to a threat level threshold. In an example implementation, request 542 may be released from queue 540 once the determined threat level reaches a level that is less than the threat level threshold. Accordingly, requests to back up data may be held until it is safe to grant the requests.

Figure 6:
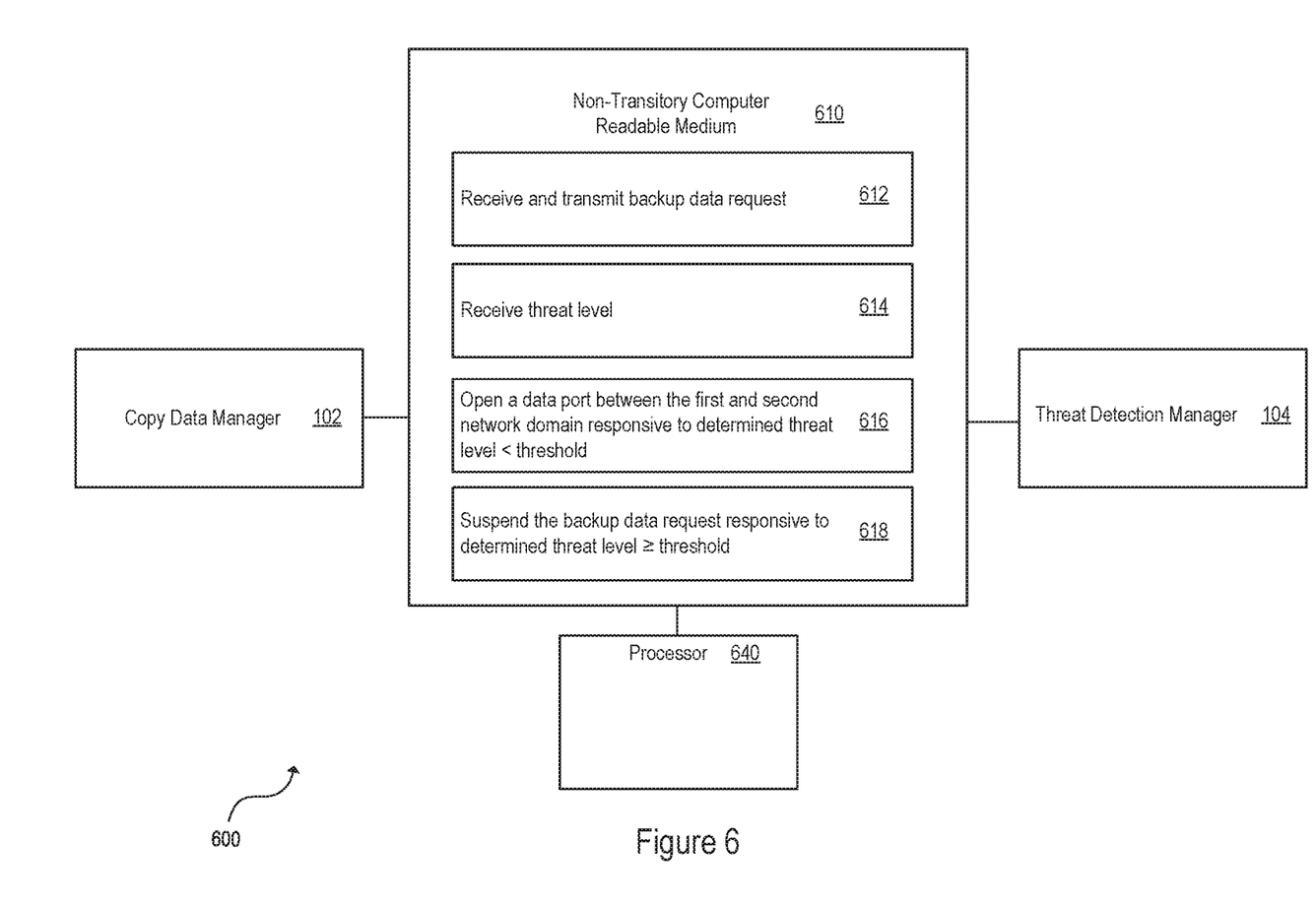
FIG. 6 is a block diagram of an example system for threat-aware copy data management.

FIG. 6 is another example system 600 for threat-aware copy data management. System 600 may include similar architecture to that of FIG. 1, including copy data manager 102, and threat detection manager 104. System 600 includes non-transitory machine readable medium 610 storing instructions for threat conscious copy data management. Non-transitory machine-readable storage medium 610 of FIG. 6 may be coupled to a processor, e.g. processor 640. Non-transitory machine-readable storage medium 610 may include executable instructions thereon.

Non-transitory machine-readable storage medium 610 may be implemented in a single device or distributed across devices. Likewise, processor 640 may represent any number of physical processors capable of executing instructions stored by non-transitory machine-readable storage medium 610. Further, non-transitory machine-readable storage medium 610 may be fully or partially integrated in the same device as processor 640, or it may be separate but accessible to that device.

In one example, the instructions may be part of an installation package that when installed can be executed by processor 610 to execute threat-aware copy data management. In this case, non-transitory machine-readable storage medium 610 may be a portable medium such as a floppy disk, CD, DVD, or flash drive or a memory maintained by a server from which the installation package can be downloaded and installed. In another example, the program instructions may be part of an application or applications already installed. Here, non-transitory machine-readable storage medium 610 may include a hard disk, optical disk, tapes, solid state drives, RAM, ROM, EEPROM, or the like.

Processor 640 may be a central processing unit (CPU), graphics processing unit (GPU), microprocessor, and/or other hardware device suitable for retrieval and execution of instructions stored in non-transitory machine-readable storage medium 610. Processor 640 may fetch, decode, and execute program instructions 612-618, and/or other instructions. As an alternative or in addition to retrieving and executing instructions, processor 640 may include at least one electronic circuit comprising a number of electronic components for performing the functionality of instructions 612-618, and/or other instructions.

Instructions 612 may receive a request to enable copy data 102 manager to back up data and may transmit the request to threat detection manager 104. Instructions 614 may further be provided to receive a threat level of a network domain, e.g. network domain 110a of FIG. 1 from threat detection manager 104.

Instructions 616 may be provided for opening a data port between network domains responsive to the determined threat level being below a threshold. For example, threat detection manager 104 may determine a threat level of network domain 110a to be below a predetermined threshold value, and, responsive to that determination, ports 132a and/or 132, and/or ports 162a and/or 162b may be opened. In other example implementations, a request may be transmitted to threat detection manager 104 to open a data port.

Instructions 618 may additionally be provided for suspending the backup data request responsive to the determined threat level being at or above the threat level threshold. Accordingly, non-transitory computer readable medium 610 may include instructions for coordinating copy data managements actions of copy data manager 102 with threat-dependent conditions detected and/or analyzed by threat detection manager 104.

In examples described herein, a storage array may be a computing device comprising a plurality of storage devices and one or more controllers to interact with host devices and control access to the storage devices. In some examples, the storage devices may include hard disk drives (HDDs), solid state drives (SSDs), or any other suitable type of storage device, or any combination thereof. In some examples, the controller(s) may virtualize the storage capacity provided by the storage devices to enable a host to access a virtual object (e.g., a volume) made up of storage space from multiple different storage devices.

As used herein, a "computing device" may be a server, storage device, storage array, desktop or laptop computer, switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 1, storage medium 120 may be implemented by one machine-readable storage medium, or multiple machine-readable storage media.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A method comprising:
   determining, by a copy data manager executed in a system comprising a hardware processor, that data is to be copied from a first network domain to a second network domain;
   in response to the determining, providing, by the copy data manager to a threat detection manager, a first request to open a data communication port for connecting the first network domain and the second network domain, wherein the data communication port is initially closed;
   receiving, by the copy data manager from the threat detection manager in response to the first request, an indication that the data communication port has been opened responsive to the threat detection manager determining that a threat level of the first network domain is below a first threshold; and
   transmitting a data object copy from the first network domain to the second network domain responsive to receiving the indication that the data communication port has been opened.

2. The method of claim 1, further comprising:
   providing, by the copy data manager to the threat detection manager, a second request to open the data communication port; and
   receiving, by the copy data manager from the threat detection manager, an indication that the second request has been denied responsive to the threat level being at or above the first threshold.

3. The method of claim 2, further comprising aborting the second request responsive to receiving the indication that the second request has been denied responsive to the threat level being at or above the first threshold.

4. The method of claim 2, further comprising suspending a replication policy of data objects at the first network domain responsive to receiving the indication that the second request has been denied responsive to the threat level being at or above the first threshold.

5. The method of claim 1, further comprising increasing a rate of producing backups of data objects at the second network domain responsive to the threat level of the first network domain being above the first threshold.

6. The method of claim 1, further comprising:
   receiving an indication that the threat level is at or above a second threshold; and
   responsive to receiving the indication that the threat level is at or above the second threshold, modifying a retention policy of the second network domain to increase a retention time of data object copies in the second network domain.

7. The method of claim 1, further comprising:
   receiving an indication that the threat level is at or above a second threshold; and
   creating an offline backup of data at the second network domain responsive to receiving the indication that the threat level is at or above the second threshold.

8. A non-transitory computer readable medium comprising instructions that upon execution cause a system comprising a processor to:
   receive a request to enable a copy data manager to back up data from a first network domain to a second network domain;
   in response to the request, determine a threat level of the first network domain;

responsive to the determined threat level being below a threshold, open a data port to enable a data transfer between the first network domain and the second network domain; and responsive to the determined threat level being at or above the threshold:
deny the request, and
increase a rate of producing copies of data objects at the second network domain in response to the denial of the request.

9. The non-transitory computer readable medium of claim 8, wherein the instructions upon execution cause the system to:
after the increasing of the rate of producing copies of data objects at the second network domain, gradually decrease the rate of producing copies of data objects at the second network domain as a function of time.

10. The non-transitory computer readable medium of claim 8, wherein the instructions upon execution cause the system to, in response to the determined threat level being at or above the threshold, hold the request in a queue until the threat level drops below the threshold.

11. A system comprising:
a processor; and
a non-transitory storage medium storing instructions executable on the processor to:
receive a request to enable a copy data manager to back up data from a first network domain to a second network domain, wherein the first network domain and the second network domain are in communication via a data port;
in response to receipt of the request, determine a threat level of the first network domain;
responsive to the threat level being below a threshold, open the data port; and
responsive to the threat level being at or above the threshold:
deny the request, and
modify a retention policy of the second network domain to increase a retention time of data object copies in the second network domain.

12. The system of claim 11, wherein the instructions are executable on the processor to further:
receive an indication from the copy data manager that the backup of data from the first network domain to the second network domain is complete; and
responsive to receiving the indication, close the data port.

13. The system of claim 11, wherein the first network domain is of a first data center at a first physical location, and the second network domain is of a second data center at a second physical location different from the first physical location.

14. The system of claim 11, wherein the data port is a virtual port of the first network domain or the second network domain.

15. The system of claim 11, wherein the data port is a physical port of a device of the first network domain or the second network domain.

16. The system of claim 11, wherein the instructions are executable on the processor to further:
determine that the threat level has dropped below the threshold after being at or above the threshold; and
in response to determining that the threat level has dropped below the threshold after being at or above the threshold, further modify the retention policy of the second network domain to reduce a retention time of data object copies in the second network domain.

17. The system of claim 11, wherein the instructions are executable on the processor to further, responsive to the threat level being at or above the threshold, suspend a replication policy of data objects at the first network domain.

18. The system of claim 11, wherein the instructions are executable on the processor to further, responsive to the denial of the request, hold the request in a queue.

19. The system of claim 18, wherein the instructions are executable on the processor to further release the request from the queue responsive to determining that the threat level has dropped below the threshold.

* * * * *